Nov. 23, 1965  D. H. TAYLOR  3,219,102
METHOD AND APPARATUS FOR DERIVING HEAT
FROM REFRIGERANT EVAPORATOR
Filed Dec. 22, 1961  2 Sheets-Sheet 1

INVENTOR.
DAVID H. TAYLOR
BY
*Whiteley and Caine*
ATTORNEYS

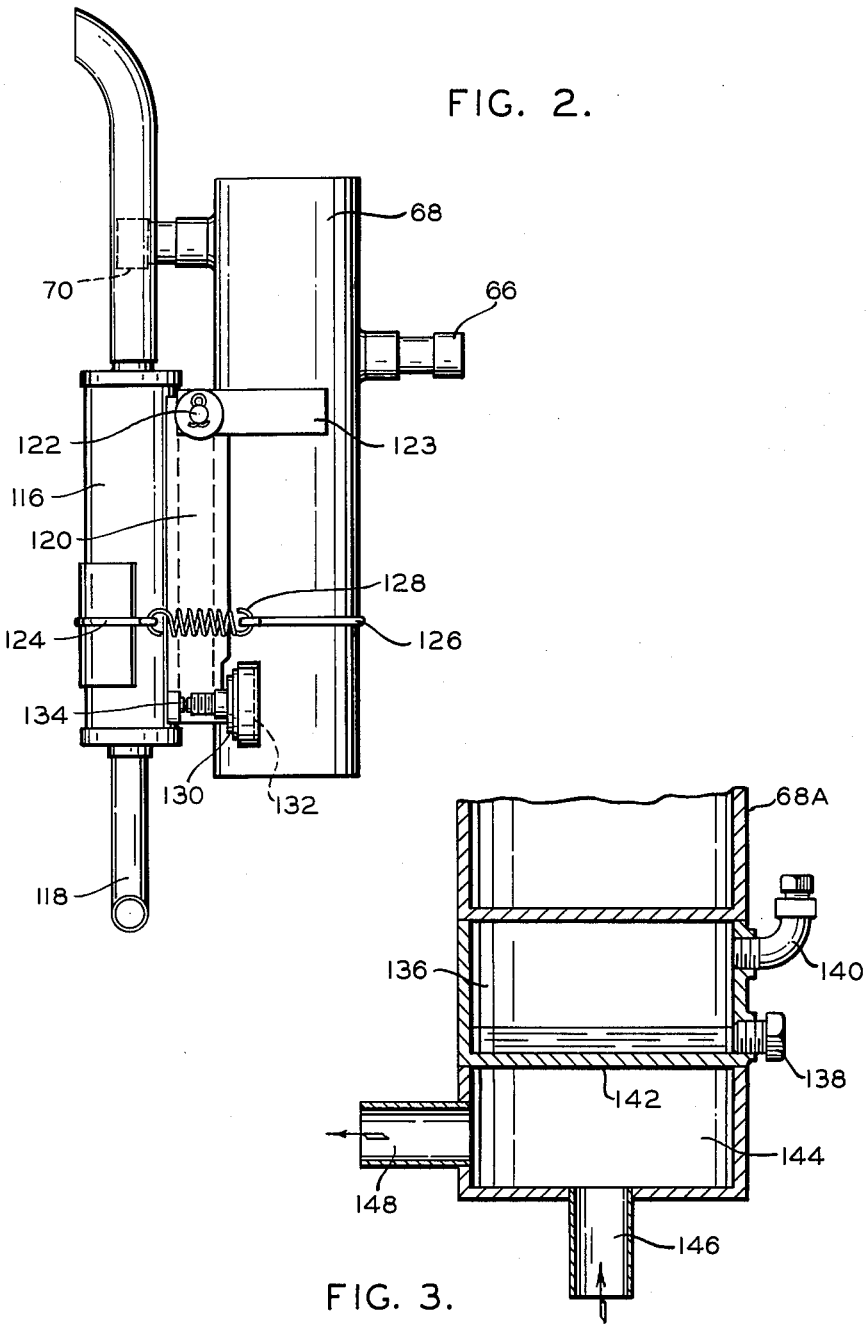

United States Patent Office 3,219,102
Patented Nov. 23, 1965

3,219,102
METHOD AND APPARATUS FOR DERIVING HEAT FROM REFRIGERANT EVAPORATOR
David H. Taylor, Minneapolis, Minn., assignor to Thermo King Corporation, Minneapolis, Minn., a corporation of Delaware
Filed Dec. 22, 1961, Ser. No. 161,623
4 Claims. (Cl. 165—2)

This invention relates to improvements in refrigeration. In general, the invention is concerned with method and apparatus for deriving heat from the evaporator of a refrigeration system through the employment of super-heated refrigerant. More particularly, the invention is concerned with the increasing of the heat output from the evaporator following a modification of the circuit by increasing the mass flow of the refrigerant fluid, and by the addition of external heat to the refrigerant fluid.

In the transportation of perishable products, it is recognized that it is necessary to provide refrigeration for the cargo space. It is also well known that it is equally necessary to alternately provide heat to remove the accumulation of frost or ice from the refrigerant evaporator, and in connection with the transporting of perishables through areas having a cold climate to provide a certain amount of heat to prevent excessive cooling or freezing of the perishable products. The most efficient method of providing the heat necessary to defrost the evaporator and/or to prevent excessive cooling of the cargo space is obtained by reversing or modifying the flow of refrigerant through the refrigerating system so as to utilize the heat of the compressor to super heat the refrigerant fluid. When an internal combustion engine is used as the prime mover for driving the compressor, in addition to the heat of compression, waste engine heat may also be added to the refrigerant to aid in heating the evaporator. Such an arrangement is disclosed in Jones Patent 2,526,874, which has been assigned to the assignee of this application.

As the size and capacity of vehicles used for the transportation of perishable goods are increased and are permitted to move at greater speeds, the requirement of rapid defrosting and of heating the space to prevent damage to the goods has likewise increased. These requirements are particularly necessary in the instance of transporting fresh perishable foods through areas where the ambient temperature is less than 20° F., and there may be heat losses from the transport vehicle for under such conditions the amount of heat normally obtained by defrosting will be inadequate to prevent freezing of the products.

One of the handicaps of the prior art practices applicable to transport refrigeration that is capable of modification for heating, has been that during the heating phase a substantial amount of the refrigerant fluid in the system is retained inactive, principally in the receiver. Therefore, the fluid which is used to produce the heating effect, even though super heated by the action of the compressor, and possibly further heated by the use of waste engine heat is still but a part of the fluid in the system and does not produce the extent of heat transfer that could be obtained if most of the refrigerant in the system could be heated for this purpose, since a greater mass flow of refrigerant through the evaporator would produce higher pressure and greater heat exchange. However, it is recognized that if all or most of the refrigerant in the system were vaporized and super heated without some control, a dangerous condition might be created within the system, including the overloading of the compressor.

In the present invention, for heating purposes, the refrigerant supply in the receiver is forced into the circuit and by means of a convenient form of external heat, in addition to the heat created by the compressor, a large mass flow of hot gas is provided to produce substantial heating through the evaporator. To prevent a dangerous condition from being formulated within the system, the amount of external heat added to the refrigerant is controlled, and also the flow of hot gas through the system is controlled to prevent overloading the compressor.

An object of the invention is to provide an improved method of deriving heat from the evaporator of a refrigerant system by increasing the amount of refrigerant fluid that is circulated through the evaporator and by imparting external heat to such fluid.

Another object is to provide a method of deriving heat from refrigerant that is circulated through the evaporator of a refrigeration system by increasing the amount of fluid in vapor form which is circulated through the evaporator and by controlling the amount of external heat which is added to such fluid to increase its temperature to a degree where it provides a substantial medium for heating the space in which the evaporator is located.

A further object is to provide a method of deriving heat from the evaporator of a refrigerant system by imparting controlled super heat to the refrigerant fluid, and by controlling the amount of heated fluid which is circulated through the evaporator.

Other and further objects may become apparent from the following specification and claims, and in the appended drawings in which:

FIG. 2 is a side elevation of a portion of the apparatus shown in FIG. 1, illustrating one mode of utilizing waste engine heat for super-heating the refrigerant fluid; and FIG. 3 is a side elevation of a modification of the structure shown in FIG. 2.

Figure 1:
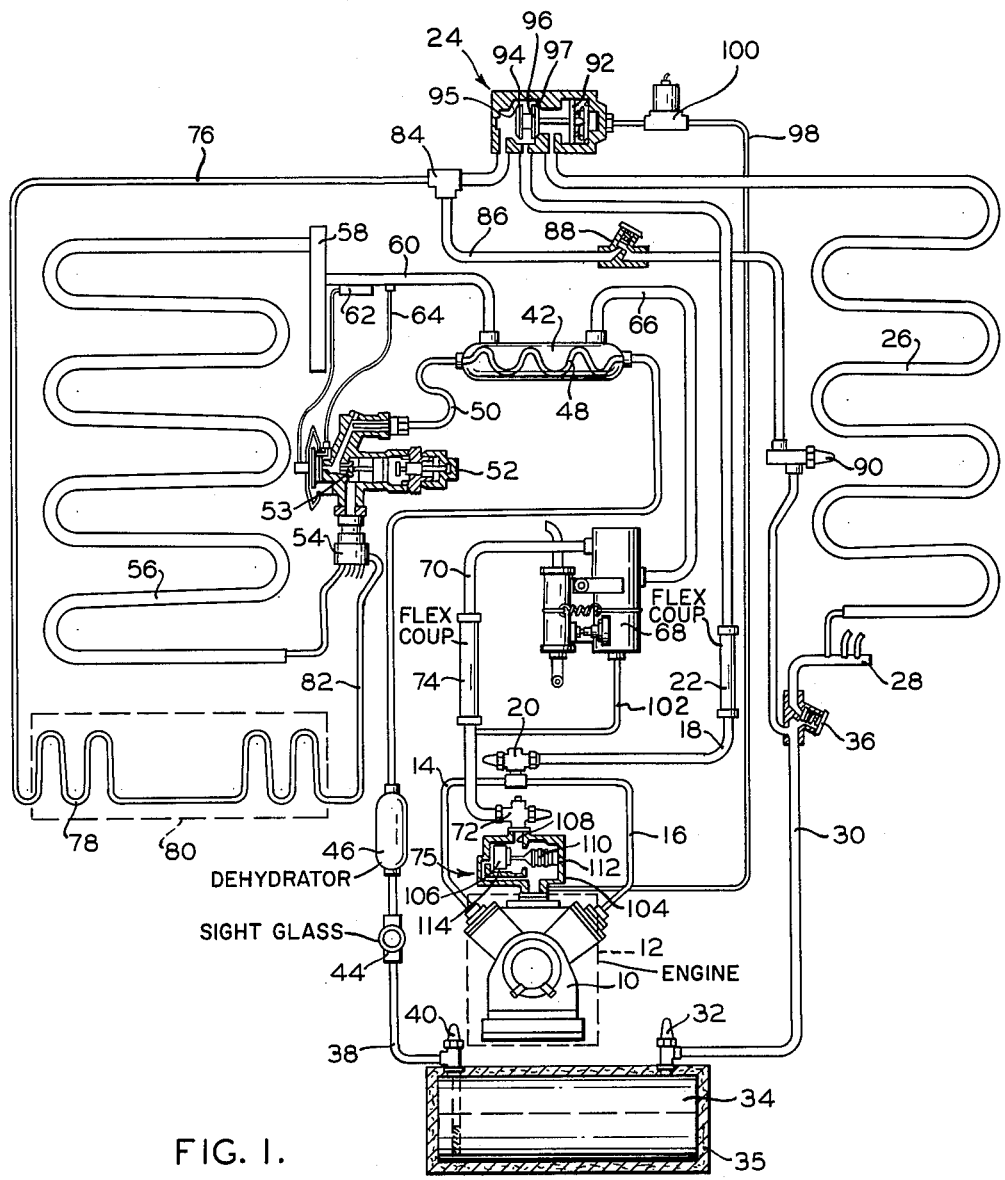
FIG. 1 is a schematic diagram of a refrigeration system embodying the present invention.

Referring to FIG. 1, reference character 10 designates a refrigerant compressor, which is driven by an internal combustion engine, shown in dotted lines and indicated by reference character 12. A pair of conduits 14 and 16 extend from the discharge ports of the compressor 10 to a conduit 18 that contains a control valve 20 and a flexible connection 22, the latter serving to absorb vibrations of the system. The conduit 18 extends to a three-way valve designated by the general reference numeral 24. Extending from on of the ports of valve 24 is a conduit 26 that forms a condenser coil, and which may be one of several coils that is coupled to a discharge header 28. A conduit 30 extends from the header 28 to an inlet valve 32 of a receiver 34, and this conduit contains a check-valve 36. The receiver 34 is preferably protected by a layer of thermal insulation 35. A conduit 38 extends from an outlet valve 40 on the receiver 34 to a heat exchanger 42, and conduit 38 contains a sight glass 44, and a dehydrator 46. The heat exchanger 42 is composed of an outer shell and an internal coil 48 which is in heat exchange relationship with the space within the shell 42. A conduit 50 extends from the heat exchanger 42 to an expansion valve 52. A notch 53 is formed in the seat of the valve 52 to provide a minimum flow of fluid through the valve when the latter is closed. A distributor 54 extends from the expansion valve and has multiple connections extending therefrom for connection to multiple tubes of an evaporator 56, here shown merely as a single coil. The single coil of evaporator 56, at its outlet end, is joined through a header 58 to a conduit 60 that extends to the shell of heat exchanger 42. The expansion valve 52 is provided with a thermal bulb 62 and a balancing conduit 64 that extends to the conduit 60. A conduit 66 connects the shell of the heat exchanger 42 with a closed accumulator tank 68. A conduit 70 extends from the accumulator tank 68 to a valve 72, and this conduit also contains a flexible connection 74. The valve 72 is joined to a throttling valve indicated by general reference numeral 75.

A hot gas conduit 76 extends from a third port in valve 24 to a coil 78 located in a drip pan 80 indicated by the dotted lines that is located beneath the evaporator 56. A conduit 82 extends from the coil 78 to the distributor 54. From a T 84 in the conduit 76, a branch conduit 86 that contains a check valve 88 extends to the conduit 30 beyond the check valve 36, and conduit 86 contains a shut-off valve 90.

The three-way valve, indicated by general reference numeral 24, is composed of a spring-biased plunger 92 that carries a pair of valve members 94, 96 that cooperate with seat portions 95 and 97 formed within the interior of the valve casing to control the discharge of fluid coming from conduit 18 to the conduits 26 or 76. The plunger 92 is responsive to the pressure of refrigerant fluid in a conduit 98, that extends to the intake side of the compressor 10 and is controlled by a solenoid valve 100.

The throttle valve indicated by general reference numeral 75 is composed of a casing 104 having an inlet connection with valve 72, and a discharge connection with the compressor 10. Within the interior of the casing is a piston 106 that acts as a valve with respect to a valve seat 108. A pressure motor 110 is joined to the piston 106 and is disposed within the interior of the casing 104 and its outer surface is subject to the pressure within said casing. The interior of the pressure motor 110 is subject to barometric pressure by means of a small passage 112 that extends through the casing 104. Casing 104 is also provided with a small passage 114 that forms a by-pass around the piston 106.

Referring now to FIG. 2, the accumulator 68 consists of an enclosed tank or container with appropriate couplings to receive the conduits 66 and 70. Adjacent the accumulator 68 is a muffler 116 which is coupled by a conduit 118 with the exhaust of engine 12. A block of metal 120 of high heat conductivity is disposed between the outer surfaces of the muffler 116 and the accumulator 68, on a pivotal connection 122 formed on a strap 123. This arrangement permits relative movement of the block 120 and the muffler 116 relative to the accumulator 68. The muffler 116 and the accumulator 68 are held in thermal contact with the block 120 by a pair of fastening devices 124, 126, and a pair of coil springs 128. A thermostatic element 130 is composed of a thermal sensitive element 132 disposed within the interior of the accumulator 68, and a movable piston 134 which engages the muffler 116 so that when the temperature within the accumulator 68 exceeds a predetermined degree, the thermostatic element expands and by means of the piston 134 moves the muffler 116 on its pivot 122 away from the accumulator to thereby reduce the heat exchange with the hot gases of combustion passing through the muffler. A conduit 102 forming an oil drain, extends from the tank 68 to conduit 70.

Referring next to FIG. 3, which constitutes an alternate construction, the accumulator 68a has welded or otherwise fixed to its lower extremity a metallic chamber 136 constituting a vapor chest. The chest 136 is provided with a drain plug 138, and an inlet connection 140 by which a limited amount of a liquid of predetermined boiling point may be introduced into the chamber 136. Welded or otherwise secured to the bottom of the chamber 136 and in heat exchange relationship with a lower surface 142 of chamber 136 is an engine exhaust gas chamber 144 having an inlet opening 146, and a discharge opening 148.

In practice, the evaporator 56 is disposed in heat exchange relationship with a confined space, and an air moving means such as a blower is utilized to circulate the air within such confined space into contact with the evaporator. The control of the system, which includes the prime mover 12, provided to drive the compressor 10, and the solenoid valve 100 which controls the position of the three-way valve 24 are by independent controls which do not form a part of the present invention. Under certain conditions, it may be desirable to utilize an intermittently operated prime mover, the operation of which is controlled by a system disclosed in Patent 2,337,164, whence the solenoid valve 100 is controlled by an independent control to shift the function of valve 24 from refrigeration to heating, in accordance with the needs of the space. In the event that a continuously operated prime mover is utilized, the solenoid 100 is controlled by a system disclosed in Patent 2,992,541, which controls both the rate of operation of the prime mover and alternate heating and cooling of the space.

For providing normal refrigeration, and assuming that the prime mover 12 is driving the compressor 10, the solenoid valve 100 would be closed and the spring biased plunger 92 would be moved to the left to close valve 94 with respect to seat 95, and to open valve 96 with respect to seat 97, refrigerant fluid from the receiver 34 passes through the tube 48 within the heat exchanger 42 and thence through the expansion valve 52 and the distributor 54 to the coils of the evaporator 56 and thence through the exterior portion of the heat exchanger 42 and conduit 66 to the accumulator 68 (whose operation will be discussed hereinafter), and thence through conduit 70 to the compressor 10, whence the compressed fluid passes through the conduits 14 and 16 to the valve 20 and conduit 18 through the three-way valve 24 to the condenser 26, where the fluid is cooled and returned to the receiver 34 through conduit 30, including the check-valve 36. This arrangement is more or less conventional and the flow of fluid into the evaporator 56 is under the control of expansion valve 52, which, in turn, is controlled by the temperature-sensitive bulb 62.

For purposes of defrosting the evaporator 56, and more particularly when it is desired that the evaporator 56 supply heat to the enclosed space, a control device, not shown, energizes the solenoid within valve 100 and by virtue of the low pressure existing in conduit 98, the plunger 92 in valve 24 is moved to the right, as shown in the drawing, to close valve 96 with respect to seat 97 and open valve 94 with respect to seat 95. By this action, the condenser 26 is cut out of the circuit and will only contain such refrigerant as normally exists therein by reason of the check-valve 36. The movement of the plunger 92 of valve 24 places conduit 76 and its associated paths in direct communication with the high pressure output of the compressor, which is divided into two paths. The first of these paths consists of the conduit 76, which extends to the coil 78, located in the drip pan 80, and thence through the conduit 82 and distributor 54 to the evaporator coils 56. The second path of the high pressure fluid includes the conduit 86 extending from the T 84 to the receiver 34 and by virtue of the discharge conduit in the receiver 34, the fluid therein, most of which is in liquid form, is forced outwardly through conduit 38 to the inner coil 48 of heat exchanger 42 and thence through conduit 50 to the expansion valve 52. By reason of the notch 53 in the valve seat a minimum flow will always occur through the valve 52 even if the bulb 62 is sensing a saturated condition of the fluid leaving the evaporator, and initially this condition would exist since the fluid flowing into the evaporator 56 would be a mixture of liquid from the receiver, and hot gas from valve 24. However as such mixture is subsequently fully evaporated and superheated by the accumulator 68 as well as the compressor 10, valve 52 will subsequently move to a fully open position and allow more rapid passage of the fluid to the evaporator. From the foregoing discussion, it should be readily recognized that the initial amount of heat supplied to the refrigerant is not very great, but that with the passage of time, it continuously increases as long as waste engine heat is being supplied to the accumulator 68. Therefore, since all of the refrigerant in the system, except for a small amount that is trapped in the condenser 26, is forced into the circuit and is super-heated by the conjoint action of the compressor 10, as well as waste engine heat supplied to the accumulator 68, so that the pressure in the system, including the evaporator coils 56, increases substantially, and that such heat is radiated into the controlled space from tthe evaporator.

With the increased pressure in the fluid returning to the compressor 10, the work that must be performed by the compressor is likewise increased. The valve 75 serves to prevent overloading the compressor. When the pressure of the vapors entering casing 104 is in excess of the calibrated strength of the pressure motor 110, the latter contacts and thereby moves piston 106 to the right and in a closing direction with respect to valve seat 108 and thereby restricts the flow of gas to the compressor. Since the interior of the pressure motor 110 is in communication with atmosphere through opening 112, as the pressure in the interior of casing 104 diminishes the pressure motor will move piston 106 to the left to permit increased flow of vapors to the compressor. The by-pass 114 serves to balance the pressures on opposite sides of piston 106.

To aid in controlling the pressure, and also control the degree of super-heating of the refrigerant by waste engine heat, the supply of waste engine heat furnished to the accumulator is controlled in the manner disclosed in FIGS. 2 and 3. As disclosed in FIG. 2, when the thermostat 132 responds to a predetermined temperature, the plunger 134 moves outwardly against the engine muffler 116 to reduce the amount of heat transfer to the accumulator.

As disclosed in FIG. 3, a limited amount of liquid is introduced into the vapor chamber 136 which is in heat exchange relationship with the accumulator 68a, and the waste gas chamber 144. Steam or other hot vapors have only a limited degree of heat transfer, and since the pressure in the chamber 136 can be controlled by the amount of fluid admitted therein, this arrangement provides for a controlled transfer of waste engine heat to the fluid in accumulator 68a. Other sources of heat may be used in place of waste engine heat, if desired.

The advantages of the present invention are particularly pertinent to the field of transport refrigeration, wherein the vehicle in which the perishable goods is being transported passes through areas of extremely low temperatures, and wherein heat losses from the product might cause serious damage. Fresh fruits and vegetables, and choice fresh meat will not withstand freezing temperatures without serious consequences. This system provides normal refrigeration, together with abnormally high heating capacity when heating is required, by forcing substantially all of the refrigerant into the active circuit and substantially super-heating it. Moreover, by controlling the amount of super-heat added to the refrigerant, the system is made safe, which is particularly important, since in general, the operator of the vehicle must be relieved of the responsibility for accurate control of the system.

The invention is defined in the appended claims.

I claim:
1. A method of deriving heat from refrigerant fluid in a refrigeration system embodying a closed circuit including a compressor, condenser, receiver and evaporator: comprising the steps of completely blocking the flow of said fluid within said circuit with respect to said condenser while said compressor is operating, and diverting said flow through separate paths within said circuit to said evaporator and said receiver to admit compressed gas into said evaporator and also force the fluid from said receiver into the remainder of said circuit and establish the fluid pressure in said evaporator at a value exceeding the pressure within the blocked condenser.

2. The process described in claim 1, in which additional heat is applied to a part of the circuit to further increase the fluid pressure in said evaporator substantially above the value of the pressure within the blocked condenser.

3. A refrigeration system embodying a closed fluid circuit including a compressor, condenser, receiver and evaporator, a one-way check valve disposed between the outlet end of said condenser and said receiver, a first conduit in said circuit operatively connecting the discharge end of said receiver and the inlet end of said evaporator, a second conduit in said circuit operatively connecting the outlet end of said evaporator and the low pressure side of said compressor, a third conduit in said circuit having its outlet end extending to the inlet end of said evaporator, a branch conduit extending from adjacent the inlet end of said third conduit to the inlet end of said receiver, and a two-position three-way valve disposed in said circuit and operatively connected to the inlet end of said third conduit, the high pressure side of said compressor and also the inlet end of said condenser, said valve when in one of its positions is with said check valve adapted to completely block the flow of fluid within said circuit to said condenser while said compressor is operating and also diverting said flow through said third conduit and through said branch conduit in divided paths to the inlet end of said evaporator to establish the fluid pressure within said evaporator to a value exceeding the pressure within said blocked condenser.

4. The structure recited in claim 3, together with means for controllably adding heat to the first of said conduits.

References Cited by the Examiner
UNITED STATES PATENTS

| 1,702,351 | 2/1929 | Leveque | 236—33 |
| 2,627,730 | 2/1953 | Zearfoss | 62—278 |
| 2,710,507 | 6/1955 | Ashley | 62—155 |
| 2,713,249 | 7/1955 | Schordine | 62—155 |
| 2,745,254 | 5/1956 | Malkoff | 62—278 X |
| 2,762,206 | 9/1956 | Ashley | 62—81 |
| 2,829,869 | 4/1958 | Philipp | 165—43 |
| 3,060,699 | 10/1962 | Tilney | 62—196 |

ROBERT A. O'LEARY, *Primary Examiner.*

ALDEN D. STEWART, CHARLES SUKALO,
*Examiners.*